United States Patent
Kubala et al.

(10) Patent No.: US 7,111,581 B2
(45) Date of Patent: Sep. 26, 2006

(54) PET FEEDER

(76) Inventors: George Kubala, 37-16 80th St., Jackson Hts., NY (US) 11372; Gary Kubala, 405 Wading River Rd., Manorville, NY (US) 11949-3446

(*) Notice: Subject to any disclaimer, the term of this patent is extended or adjusted under 35 U.S.C. 154(b) by 55 days.

(21) Appl. No.: 10/879,454

(22) Filed: Jun. 30, 2004

(65) Prior Publication Data

US 2006/0000418 A1   Jan. 5, 2006

(51) Int. Cl.
*A01K 5/00* (2006.01)
(52) U.S. Cl. .................................... 119/53.5
(58) Field of Classification Search ............. 119/51.01, 119/52.1, 53, 53.5, 54, 56.1; 222/162, 167
See application file for complete search history.

(56) References Cited

U.S. PATENT DOCUMENTS

| | | | | |
|---|---|---|---|---|
| 1,476,493 A | * | 12/1923 | Cook | 119/52.1 |
| 3,763,826 A | * | 10/1973 | Portelli | 119/52.1 |
| 3,999,519 A | * | 12/1976 | Rodemeyer | 119/475 |
| 4,770,125 A | * | 9/1988 | Gold et al. | 119/53.5 |
| 4,823,738 A | * | 4/1989 | Gold | 119/51.01 |
| 5,054,657 A | * | 10/1991 | Morse et al. | 222/162 |
| 5,272,998 A | * | 12/1993 | Pannier et al. | 119/53.5 |
| 5,467,736 A | * | 11/1995 | Reynolds | 119/52.2 |
| 5,908,007 A | * | 6/1999 | Duin | 119/51.11 |

FOREIGN PATENT DOCUMENTS

| | | | |
|---|---|---|---|
| FR | 2623370 | * | 5/1989 |
| WO | WO88/02215 | * | 4/1988 |

* cited by examiner

*Primary Examiner*—T. Nguyen
(74) *Attorney, Agent, or Firm*—Epstein Drangel Bazerman & James, LLP

(57) ABSTRACT

A pet feeding device comprising a container for pet food from which food is controllably provided through action by the pet itself in moving the container.

20 Claims, 6 Drawing Sheets

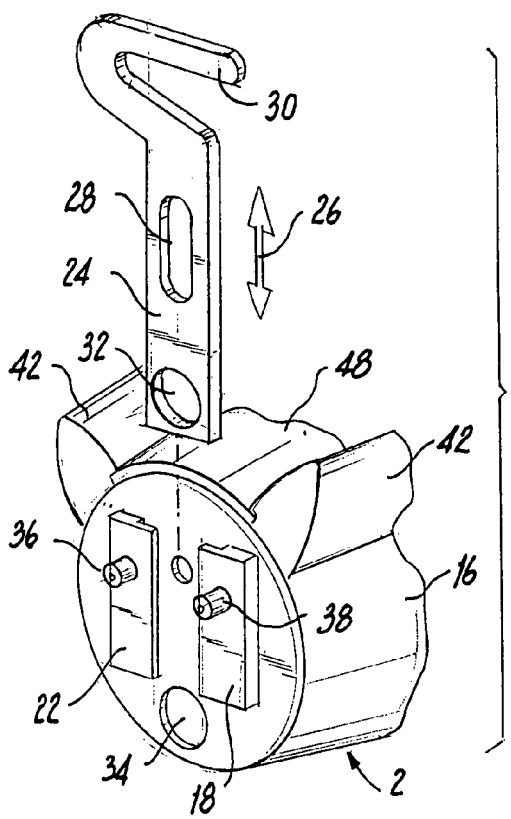
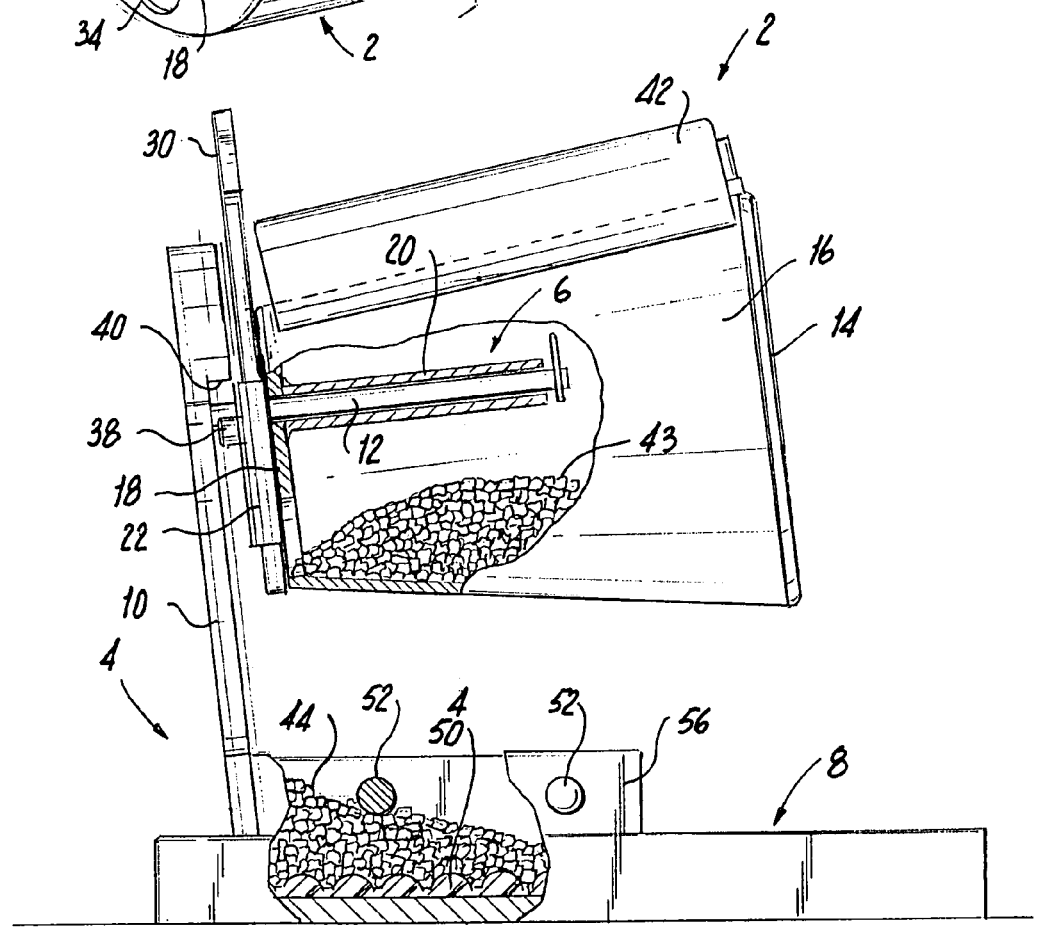

PET FEEDER

BACKGROUND OF THE INVENTION

This invention relates to a device for the self-feeding of pet animals, particularly, but not exclusively, cats.

As to those who are familiar with house pets, and particularly cats, will readily recognize, pet feeding is not an inconsequential matter from the points of view of both the owner and the pet. From the owner's point of view the feeding of the pet is a chore which, if the desire of the pet to be fed is to be taken into account (and the pet usually sees to it that it is a matter of immediate concern), not only occurs frequently but often at inconvenient hours, so that sometimes it is a matter of debate as to who is really in charge. From the pet's point of view the problems of obesity and lack of exercise afflict pets today, just as those matters often concern their owners. In addition, just as with humans, if a pet does not have to work for its dinner or get sufficient exercise it tends to become apathetic, and hence less healthy and less pleasing to its owner.

It is very easy for pets to over-eat because owners, with the best of intentions, tend to load the feeding dish with an excess of food and the pet, like some owners, tend to eat all that is put in front of it even after the need for additional sustenance actually has been satisfied.

It is therefore highly desirable to provide means by which the feeding of a pet is controlled without requiring the supervision of the owner and which is under the control of, and actually powered by, the pet itself.

SUMMARY OF THE INVENTION

The present invention accomplishes those ends by providing a supply of food, usually in the form of pellets or other particles, and dispensing that food to the pet only when the pet wants the food, requiring physical effort on the part of the pet to get the food, and with the amount of food to be provided entirely under the control of the pet. Consequently, the pet, after a brief period of training, will be able to control its own feeding without having to seek any assistance on the part of its owner, with physical effort being required on the part of the pet in order to gain access to the food. Optionally structure to inhibit ready access to the dispensed food may also be provided, providing an additional challenge and requiring additional physical activity on the part of the pet before the food particles may be obtained and eaten.

In accordance with the present invention the food particles are contained within a container capable of moving, preferably in full or limited rotation, and provided with one or more protrusions which the pet may engage with its paw to cause the container to move. The movement agitates the food pellets or other particles in the container and causes them to tend to escape from the containers through an opening at the rear of the container, from which the pellets drop to the area below the container to which the pet has access. The size of the exit opening or openings may be adjustable, thereby to vary the amount of food which will escape from the container opening or openings, for a particular movement thereof. In a preferred embodiment the container is so mounted and arranged that it has a preferred standby position from which it can be moved in either direction to only a limited extent, so that the feeding movement of the container is more readily controlled by the pet. As an added feature the device of the present invention may have a floor onto which the pellets fall from the container which may be corrugated and/or provided with spaced obstructions extending thereacross, thus presenting physical challenges to the pet to gain access to the food. In its preferred form the container is of drum-shape loaded from the top through a relatively wide opening which, when the cover provided is not in place, gives the pet access to the food in the container through that top opening, a feature helpful in training the pet to use the device. The drum is preferably mounted to rotate or oscillate about an axis which is slightly forwardly and upwardly inclined. This facilitates the escape of the food particles through the exit passage or passages in the back of the drum. The drum may be mounted on its axis so as to tend to come to a normal stationary position, as by being counterweighted or mounted on an axis offset from the center of the cross-section of the drum.

DESCRIPTION OF THE DRAWINGS

The preferred embodiments of the present invention as described in the appended detailed description are shown in the accompanying drawings, in which:

FIG. 3 is a fragmentary perspective view of the rear of a food container;

FIG. 4 is a side view of the embodiment of FIG. 1 partially broken away;

DETAILED DESCRIPTION OF THE INVENTION

Figure 1:
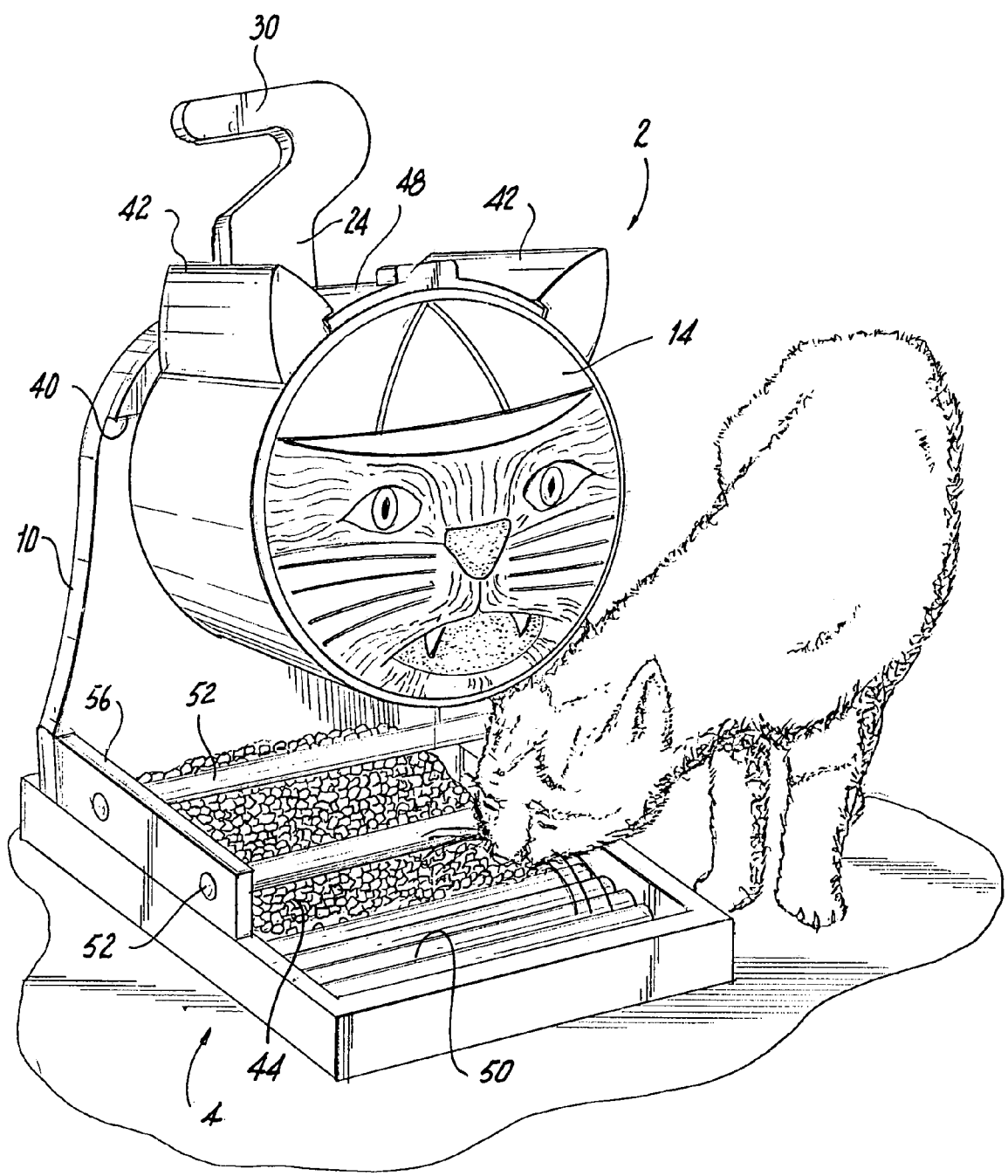
FIG. 1 is a three-quarter front perspective view of a preferred embodiment.

In its preferred form, shown in FIGS. 1–6, the feeder comprises a food container generally designated 2 mounted on a supporting structure generally designated 4 so as to pivot about an axis generally designated 6. The supporting structure 4 which is here specifically disclosed comprises a floor 8 connected to an upstanding wall 10. Extending out from the wall 10 and slightly inclined upwardly is a shaft 12. The container 2 comprises a front wall 14, a generally cylindrical side wall 16 and a rear wall 18. The shaft 12 extends through the rear wall 18 into the interior of the container 2, the rear wall being provided with a sleeve 20 through which the shaft 12 extends. Thus the container 2 is mounted on the upstanding wall 10 so as to be rotatable about the shaft 12, which defines the axis 6. The rear wall is provided with a food exit opening 34 at what will be its lower portion.

Figure 2:
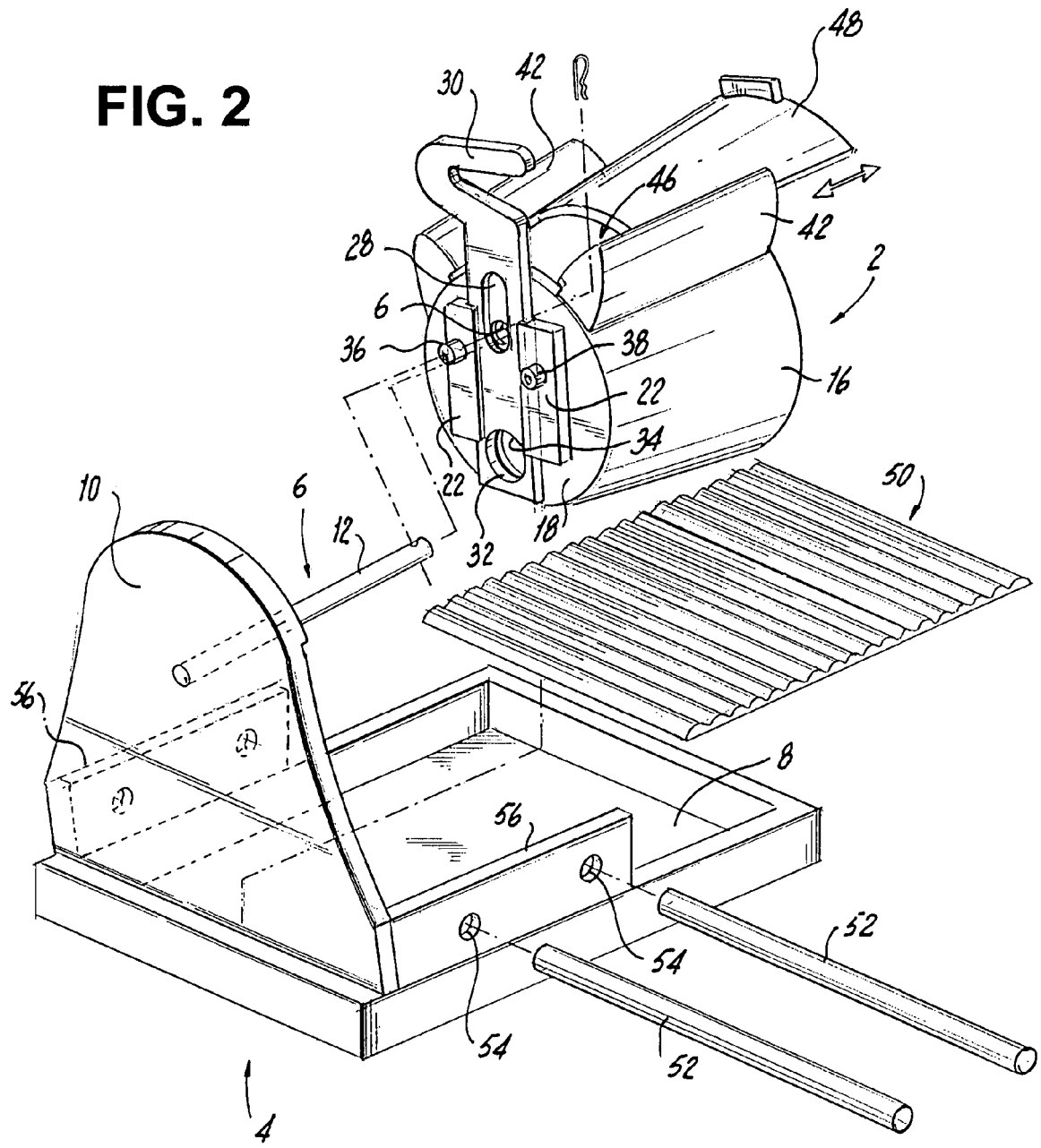
FIG. 2 is a three-quarter rear exploded perspective view of the embodiment of FIG. 1.
Figure 5:
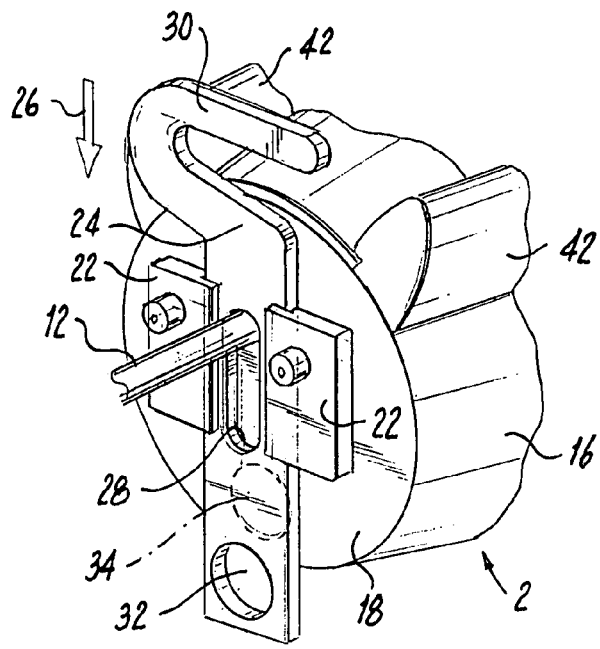
FIG. 5 is a view similar to FIG. 3 but showing the position of the parts when the feeder is to be deactivated.
Figure 6:
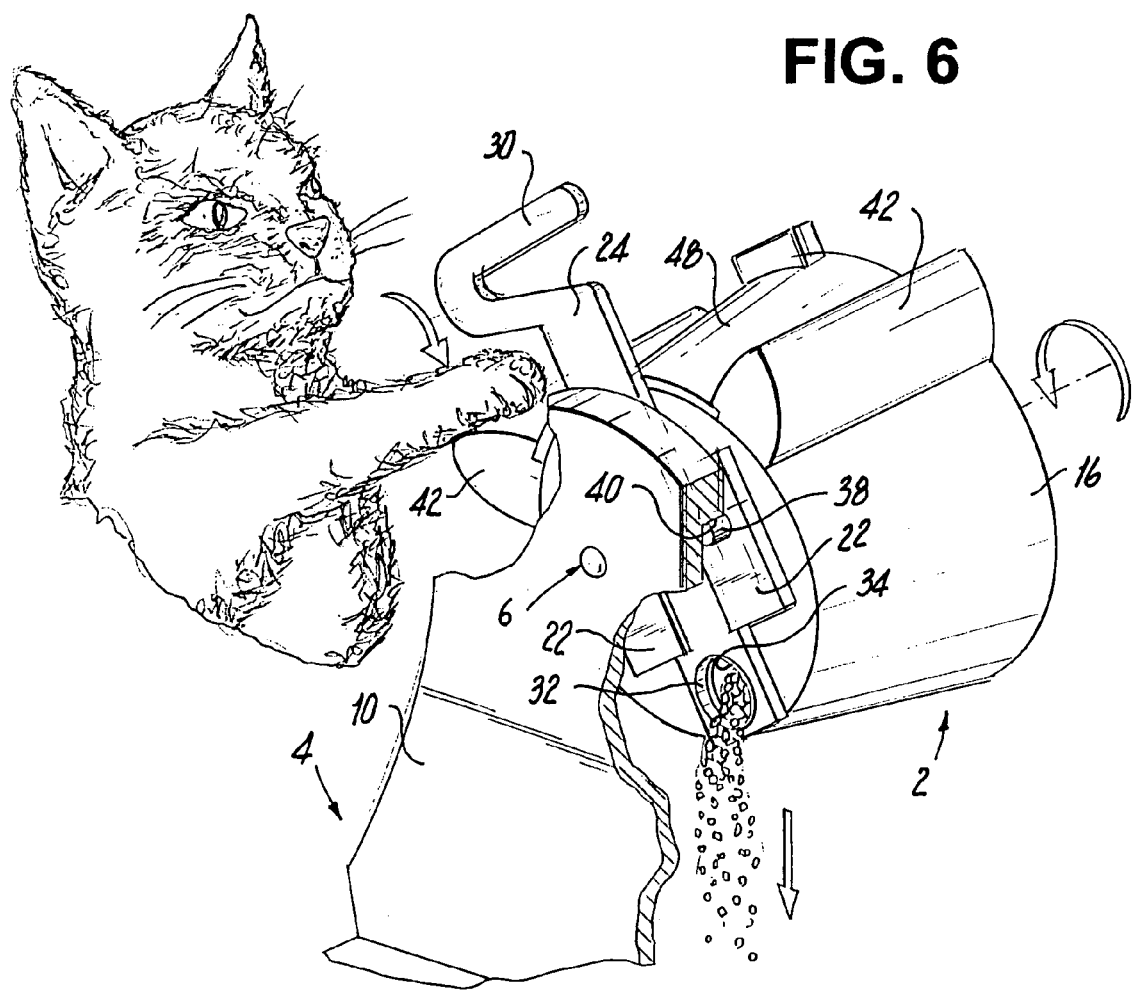
FIG. 6 is a three-quarter perspective view showing one way in which a pet may manipulate the device to obtain food.

The rear wall 18 is provided on its exterior with a pair of cleats 22, and the control piece 24 is designed to be slideable beneath the cleat 22 between upper and lower positions, as shown in FIGS. 4 and 5, respectively, and as indicated by the arrows 26 to FIGS. 3 and 5. The piece 24 is provided with an elongated slot 28 through which the shaft 12 passes, thus permitting and limiting the up and down movement of the piece 24. The upper portion of the piece 24 is provided with a manually accessible part 30 for moving the piece 24 up and down. In its lower position, shown in FIG. 5, the food exit opening 32 at the bottom of the piece and the food exit opening 34 in the rear wall 18 of the container 2 are out of alignment so that no food can escape through the opening 34. However, when the piece 24 is in its upper position, as shown in FIGS. 2 and 6, the openings 32 and 34 will register and food can then escape from the container 2. Movement of the piece 24 need not be rectilinear to bring the two feed openings into and out of registration, and the piece 24 may have a plurality of different size openings 32 which, when selectively brought into registration with the feed opening 34 in the container, will produce different rates of food dispensing.

The cleats 22 are shown as provided with outstanding lugs 36 and 38, and the upper portion 10 of the rear wall 10 is provided with ledges 40, one on each side, in line with lugs 36 and 38 respectively. The container 2 is provided with outward protrusions 42 which, as shown in FIG. 6, may be engaged by the pet's paw in order to turn the container 2 in one direction or the other, and in the embodiment of FIGS. 1–6 that movement will continue until one or the other of the lugs 36 or 38 engages a stop, here shown in the form of a ledge 40, as shown in FIG. 6. Since that limits rotation of the container 2 (180° of rotation is appropriate, but not required), the pet will release the protrusions 42 and the container 2 will then rotate back to its normal standby position, either because of the weight of the mass of food particles 42 in the container 2 or because the container may be counter-weighted or because the axis of shaft 12 is somewhat above the center of gravity of the container itself or because of some other arrangement. Thus for each manipulation of a protrusion 42 by the pet a small amount of food will escape from the container and fall onto the floor 8 as indicated by the food mass 44 in FIG. 4.

As illustrated, the front wall 14 of the container 2 may be ornamental to represent the face of a cat, the protrusion 42 may simulate the cat's ears and the upstanding handle portion 30 of the piece 24 may simulate a cat's tail. Other forms of ornamentation will suggest themselves, preferably in the form of interchangeable panels or sheets.

As may best be seen in FIG. 2, the container 2 is provided at its top with a large filling opening 46 with a slideable cover 48. The opening 46 preferably extends substantially the full length of the container 2 not only to facilitate filling the container 2 with the desired amount of food particles, but also to assist in training the pet to use the device. At the outset the food particles will be placed in the container 2 and the cover 48 will be removed. This provides an opening through which the pet can see the food in the container 2 and through which the pet can insert its paw to get the food. In so doing it will usually cause the container 2 to rotate. This will cause some food to fall from the container 2 when the exit opening 34 is exposed, and the pet will thus learn that by turning the container 2 food is made available on the floor, where it is more readily available than in the container 2. After a brief learning period the cover 48 will be put in place, and then the pet will use what it has learned to get food when the container 2 is moved.

While the device as thus far described will, particularly when the container cover 48 is in place, force the pet to "work for its dinner", certain additional work-requiring features may be present. Thus, as shown in FIGS. 1 and 2, the floor 8 may be provided with a corrugated upper surface 50, and optional rods 52 may be mounted to extend over the floor 8, with or without the corrugated surface 50, as by passing through apertures 54 in side walls 56 upstanding from the floor 8, thus making access to the food particles 44 on the floor more difficult to the pet. The periphery of the upstanding wall 4 on which the shaft 12 is mounted preferably tapers upwardly so that the pet has ready access to the protrusions 42.

Figure 7:
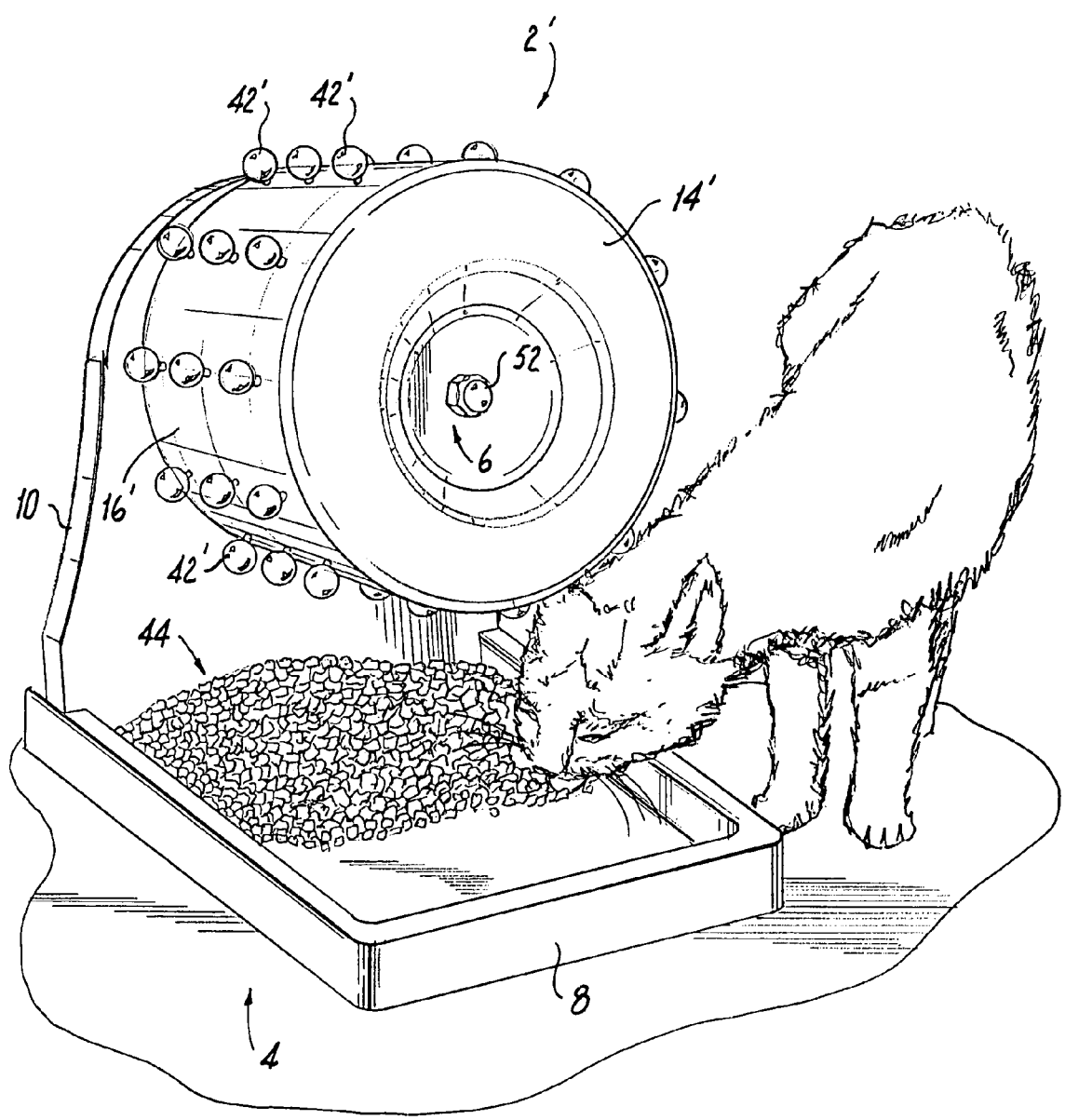
FIG. 7 is a view similar to FIG. 1 but showing an alternate embodiment of the invention.
Figure 8:
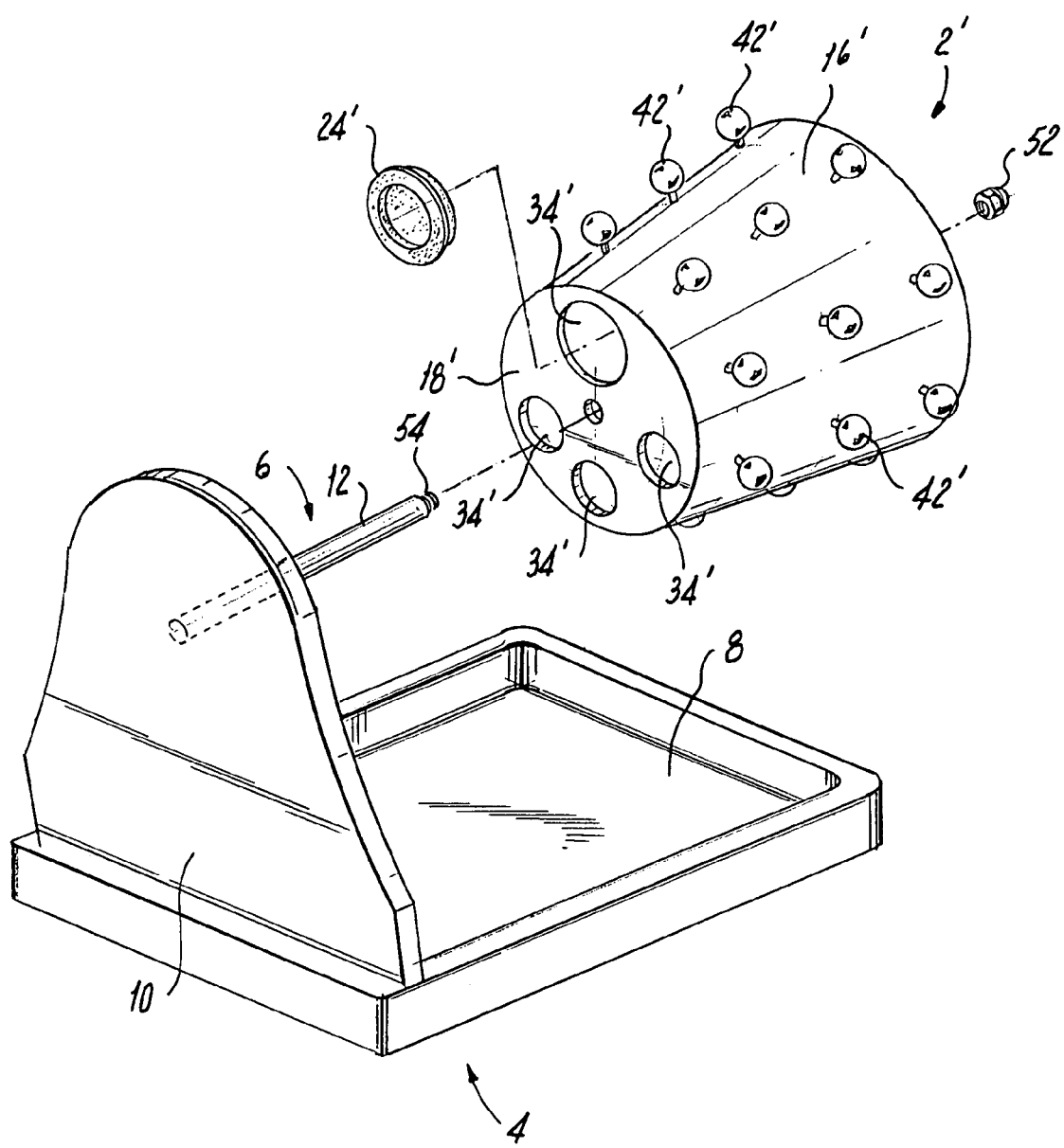
FIG. 8 is a three-quarter rear perspective exploded view of the embodiment of FIG. 7.

FIGS. 7 and 8 show an alternate embodiment of the present invention in which the container $2^1$ is fully rotatable about the axis defined by the shaft 12, in this instance the shaft 12 extends through the front wall $14^1$ of the container $2^1$, the container $2^1$ being retained on the shaft 12 by any appropriate structure, here shown as a nut 52 screwed onto the tip 54 of that shaft 12. Because the container $2^1$ is rotatable on the shaft 12 without restriction it is provided with protrusion $42^1$ throughout its periphery. Its rear wall $18^1$ is provided with one or more exit openings $34^1$, which may be of different sizes, and which are selectively provided with closing plugs $24^1$, selection of which of the plugs $24^1$ to remove from the rear wall $18^1$ determining the rate at which food will fall from the container $2^1$ when it is rotated.

It will be understood that, particularly but not exclusively with the embodiment of FIGS. 7 and 8, the supporting structure 4 as specifically disclosed may be completely eliminated, the supporting shaft 2 extending from any desired generally vertical supporting structure.

From the above it can be seen that the problems resulting from the tendency of pet owners to make food too easily available to their pets, and the problems involved in pets nagging their owners to feed them at inconvenient times are eliminated through use of the device disclosed. The pets must work for their food, but they do so on their own timetable and without inconveniencing their owners. Since they have to work for their food they will tend not to overeat, and hence the obesity problem is minimized. Moreover, because the pet must exercise its intellect in order to get fed the pet will tend to be more interested and therefore more interesting.

While but a limited number of embodiments have been here specifically disclosed, it will be apparent that many variations can be made therein, and that many of the disclosed features are optional and may be used in various combinations, all within the scope of the present invention as defined in the following claims.

We claim:

1. An animal feeder comprising a support, a container mounted on such support for movement relative thereto and adapted to contain food particles in bulk, cooperating means on said support and said container for limiting the extent of movement of said container to movement back and forth relative to said support to a predetermined restricted degree, means on and extending from said container which, when manually physically displaced over a given distance and then released, causes said container to move within said limited extent, said container having a first opening through which food particles are inserted into said container and a second opening spaced from said first opening from which food particles escape from said container when it is moved within said limited extent.

2. The animal feeder of claim 1, in which said container is mounted on said support for oscillation about a generally horizontal axis, said restricted degree being about 180° or less.

3. The animal feeder of claim 2, in which said generally horizontal axis is inclined outwardly upwardly to a small degree.

4. The animal feeder of claim 3, in which said container is spaced from said support and said second opening is at the lower portion of said container facing said support.

5. In the animal feeder in claim 4, means for varying the effective size of said second opening, said varying means being adjustably moveably mounted on the rear of said container.

6. In the animal feeder in claim 4, means for varying the size of said second opening, said varying means being adjustably moveably mounted on the rear of said container and having a portion extending radially from said container to comprise said means to cause said container to move.

7. The animal feeder of claim 6, in which the portion of said size varying means extending radially from said container simulates an animal part.

8. The animal feeder of claim 1, in which said first opening is located at the upper portion of said container and is provided with a removable cover.

9. The animal feeder of claim 1, in which said support comprises a generally vertical part on which said container is mounted and a floor beneath said container for receiving the food particles which escape from said container.

10. The animal feeder of claim 9, in which said floor is provided with laterally extending corrugations defining channels in which said food particles when they escape from said container will tend to be received.

11. In the animal feeder of claim 9, removable barrier elements spaced from one another and extending across said floor and effective to partly obstruct access to food particles on said floor.

12. An animal feeder comprising a generally vertical support, a container mounted on said support for movement about an axis extending from said support and wherein said axis located above a mid-point of said container, said container being adapted to contain food particles in bulk, means on and extending from said container which when moved cause said container to move about said axis, said container having a first opening through which food particles are passed into said container, said container being spaced from said support and having a second opening at its rear through which food particles escape from said container when it is moved.

13. An animal feeder comprising a generally vertical support, a container mounted on said support for movement about an axis extending from said support and adapted to contain food particles in bulk, means on and extending from said container which when moved cause said container to move about said axis, said container having a first opening through which food particles are passed into said container, said container being spaced from said support and having a second opening at its rear generally facing said support through which food particles escape from said container when it is moved.

14. The animal feeder of either of claims 12 or 13, in which said axis is inclined upwardly to a small degree.

15. In the animal feeder of claim 12, means for varying the effective size of said second opening, said size varying means being adjustably moveably mounted on the rear of said container.

16. The animal feeder of claim 12, in which the container rotates about a substantially horizontal axis and is weighted at the bottom.

17. The animal feeder of claim 12, in which said container is mounted to rotate on an axis located above its center of gravity.

18. The animal feeder of claim 12, in which said container is tapered from rear to front, thereby to facilitate movement of the food pellets to said second opening.

19. The animal feeder of claim 12, in which said vertical support is tapered upwardly so as not to extend outwardly beyond said container in the area where said container is mounted.

20. An animal feeder comprising a support having an upstanding support wall, an axis extending out from said wall, a container adapted to contain food particles in bulk, said container being mounted on said axis for rotation thereabout to at least a limited degree and having a container wall facing and spaced from said support wall, said container having a first opening through which food particles are inserted into said container and a second opening spaced from said first opening from which food particles escape from said container when it is rotated about said axis, said second opening being located in said container wall facing said support wall.

* * * * *